United States Patent [19]

Jernigan et al.

[11] 4,198,634
[45] Apr. 15, 1980

[54] OPTICAL AUTOCORRELATOR SIGNAL PROCESSOR

[75] Inventors: James L. Jernigan, Inyokern; Thomas F. O'Neill, Jr., China Lake, both of Calif.

[73] Assignee: The United States of America as represented by the Secretary of the Navy, Washington, D.C.

[21] Appl. No.: 185,418

[22] Filed: Sep. 30, 1971

[51] Int. Cl.² ................................................ G01S 3/48
[52] U.S. Cl. .............................. 343/100 CL; 324/77 K; 343/113 R
[58] Field of Search .............. 324/77 K; 343/100 CL, 343/113 R

[56] References Cited
U.S. PATENT DOCUMENTS 3,171,126  2/1965  Wiley .................... 343/100 CL X
3,359,409  12/1967  Goldstein ............. 343/100 CL X Primary Examiner—Maynard R. Wilbur
Assistant Examiner—Richard E. Berger
Attorney, Agent, or Firm—R. S. Sciascia; W. Thom Skeer; Robert Adams

[57] ABSTRACT

A correlation receiver for detecting and measuring the angle-of-arrival of radio frequency signals, including two antennas, a correlation processor, and a CRT display.

6 Claims, 3 Drawing Figures

OPTICAL AUTOCORRELATOR SIGNAL PROCESSOR

BACKGROUND OF THE INVENTION

The invention relates to the field of Electro-Optics and, more specifically, the optical and electronic processing of an electrical signal to obtain the contained information in a useable form.

If a function in the time domain can be expressed as follows:

$$f(t) = s(t) + s(t-d),$$

the spectrum of f(t) will be $$F(\omega) = S(\omega) + S(\omega) e^{+j\omega d}$$
$$= S(\omega)[1 + e^{+j\omega d}].$$

And the Power Spectrum of f(t) will be:

$$|F(\omega)|^2 = |S(\omega)|^2 [2 + e^{-j\omega d} + e^{+j\omega d}]$$
$$= |S(\omega)|^2 [2 + 2\cos(\omega d)]$$
$$= |S(\omega)|^2 [\cos^2(\omega d/2)],$$

which describes a waveform having peaks and nulls.

If $f_s$ is the frequency spacing between the nulls, and $f_n$ is the frequency at the $n^{th}$ null, then $$\pi = (\omega_n - \omega_{n-1})(d/2)$$
$$= (2\pi f_n - 2\pi f_{n-1})(d/2)$$
$$= (2\pi f_s)(d/2)$$
$$f_s = 1/d.$$

Since the Fourier transform of a function s(f) is $$S(f) = \int_{-\infty}^{\infty} s(t) e^{-j2\pi ft} dt.$$

And, for a real-valued function, $$S^*(f) = \int_{-\infty}^{\infty} s(t) e^{+j2\pi ft} dt$$
$$= \int_{-\infty}^{\infty} s(t) e^{-j2\pi(-f)t} dt$$
$$= S(-f).$$

The Fourier transform of the power spectrum is $$F[S(f)S^*(f)] = F[S(f)S(-f)]$$
$$= s(t)^* s(-t)$$
$$= \int_{-\infty}^{\infty} s(t) s(t-d) dt$$

which is the correlation function. The correlation function states:

Take the signal s(t), delay a portion of it by d, i.e., s(t−d), multiply the signals together, i.e., s(t)s(t−d), and integrate from −∞ to +∞ for all values of d.

DESCRIPTION OF THE PREFERRED EMBODIMENT

The present invention is a system for measuring the direction from the receiver to the source of the received radiation. If a signal arrives at an angle and is intercepted by two antennas, it will be received at two different times: t and t+d. If the time delay d can be determined, the angle of arrival α can be measured. The present invention uses this approach to measure the angle of arrival.

Figure 1:
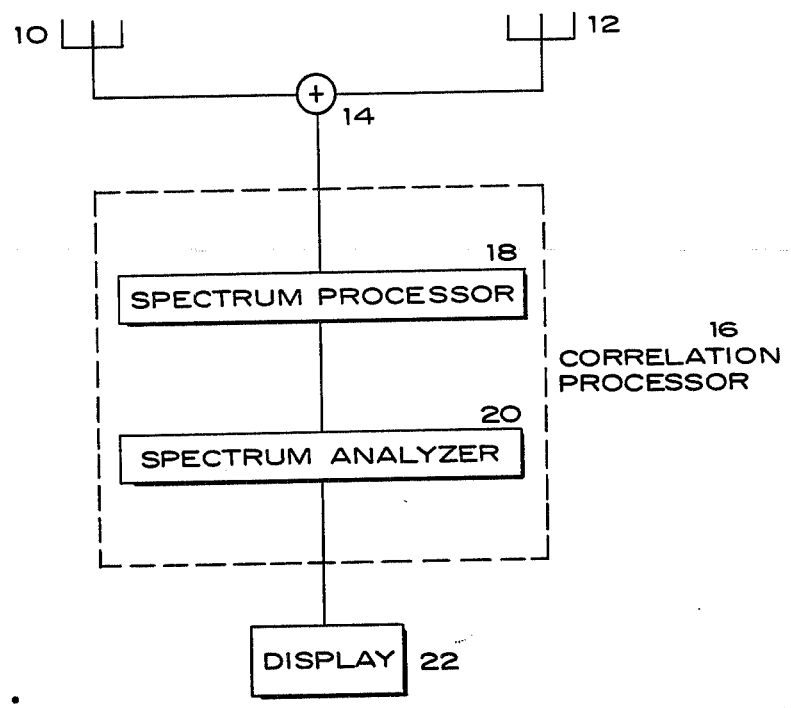
FIG. 1 is a block diagram of the present invention.

FIG. 1 shows the present invention in block diagram form and includes antennas 10 and 12, signal summer 14, correlation processor 16, and display 22. Correlation processor 16 includes spectrum processor 18 and spectrum analyzer 20.

If a signal s(t) is received by antenna 10, signal $s_1(t) = s(t) + n_1(t)$, where $n_1$ is a noise term, is coupled to mixer 14. Likewise, signal $s_2(t) = s(t-d) + n_2(t)$, where $n_2$ is a noise term and d may be a negative, zero, or positive time delay, is coupled from antenna 12 to mixer 14. The output f(t) of mixer 14 is the sum of $s_1(t)$ and $s_2(t)$, i.e., $f(t) = s(t) + s(t-d) + n_1(t) + n_2(t)$, and is coupled to correlation processor 16.

The output of spectrum processor 18 of correlation process 16 is the Power Spectrum of f(t), i.e., $|F(\omega)|^2 = |S(\omega)|^2 [\cos^2(\omega d/2)]$ which is coupled to spectrum analyzer 20. It is assumed that noise terms $n_1(t)$ and $n_2(t)$ are uncorrelated and have zero means, and that signals s(t) and s(t−d) have zero means and are not correlated with the noise terms. Consequently, the noise terms can be cancelled.

The output of spectrum analyzer 20 is the Fourier transform of the Power Spectrum, i.e., $$F[S(f)S^*(f)] = \int_{-\infty}^{\infty} s(t)s(t-d) dt,$$

which is the correlation function (see Background). The correlation function is presented on display 22 as a series of peaks centered at t=0 including side lobes centered at +d and −d (depicted in FIG. 2), wherein d is the above-mentioned time delay.

Figure 3:
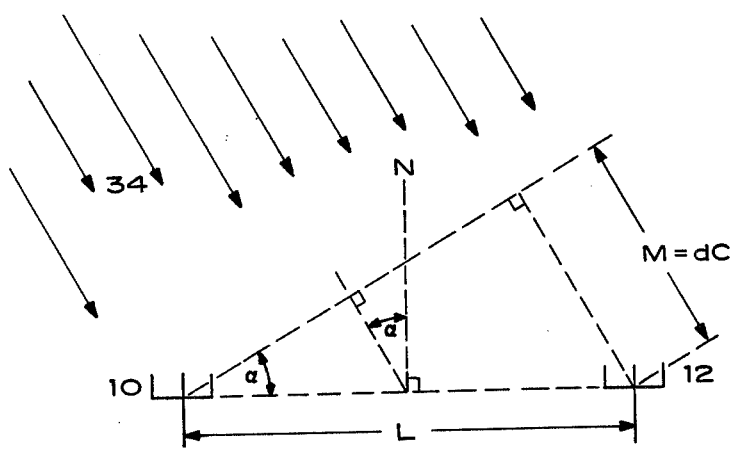
FIG. 3 is a graphical illustration of the angle of arrival measured by the present invention.

As shown in FIG. 3, the angle of arrival α of radiation 34 is related to time delay d by:

$$\alpha = \sin^{-1} M/L$$

where
  M=dC, and
  C is the velocity of light.

It has been found that to maximize the accuracy of the measured angle α, L should be as large as is practicable, the system bandwidth should be maintained broad enough to admit the entire signal spectrum, and the entire field of the display should be utilized.

Figure 2:
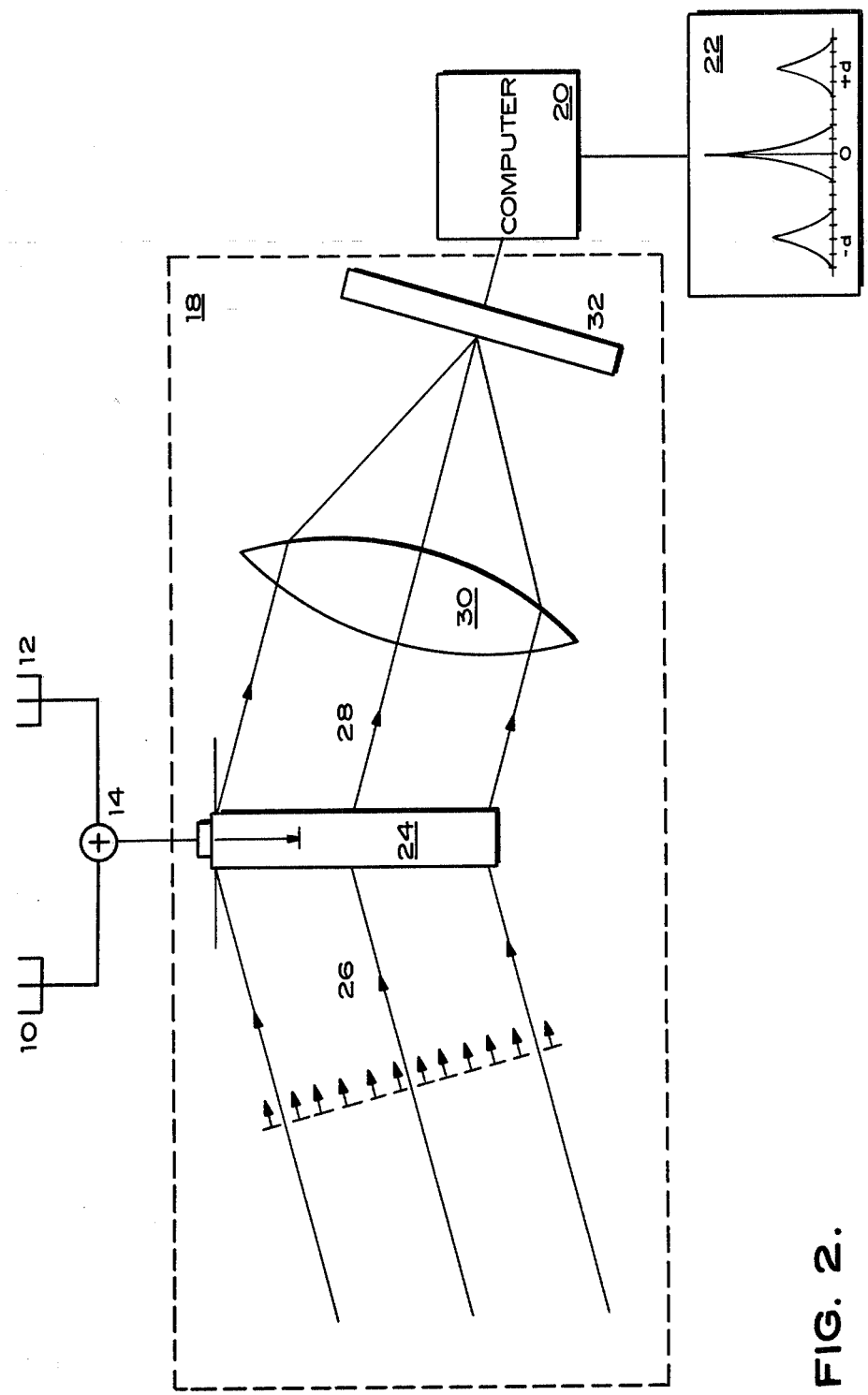
FIG. 2 is a schematic diagram, partially in block form, of the preferred embodiment of the present invention.

Although an equivalent electronic or mechanical analyzer or processor may be substituted for the optical system shown, and vice-versa, the presently preferred embodiment of the present invention is shown in FIG. 2, wherein the same or equivalent component element retains the numeric designation it had in FIG. 1. Spectrum processor 18 includes a source of illumination emitting substantially monochromatic, spatially coherent light beam 26, ultrasonic light modulator (ULM) 24, lens 30, and vidicon 32. The electrical signal output of mixer 14 is converted in ULM 24 into a traveling ultrasonic wave. Light beam 26 intersects ULM 24 at the Bragg angle, is modulated by the ultrasonic wave, and exits ULM 24 as modulated beam 28. Beam 28 includes the information contained in the electric signal output of mixer 14 and is focused on the face of vidicon 32 by lens 30. A Bragg angle system having a ULM, lens, and substantially coherent, monochromatic light source is shown in U.S. Pat. No. 3,483,386 to James L. Jernigan. The focal plane of lens 30 contains the Fourier transform, or spectrum, or f(t). Therefore, the optical system including beam 26, ULM 24, and lens 30 is a spectrum analyzer. Vidicon 32 is a square-law device which converts the spectrum of f(t) into its Power Spectrum, which is coupled to spectrum analyzer 20.

Analyzer 20 may be a digital computer which may use the Cooley-Tukey algorithm for the Fast Fourier Transform to approach real time processing. The output of analyzer 20 is coupled to display 22 which may be a cathode ray tube. A direct presentation of the signal from analyzer 20 discloses time delay d(+ or − as shown in FIG. 2) from which angle of arrival $\alpha$ can be obtained by using the equation $\alpha = \sin^{-1} dC/L$. Or, as an alternative, if L is known and fixed, display 22 may be modified to present a readout of the angle directly.

To eliminate any uncertainty in the sign of the angle, i.e., whether the direction is plus or minus the measured number of degrees from N of FIG. 3, an artificial time delay may be placed between one of the antennas and mixer 14. The delay may be either continuous and greater than the maximum signal delay or pulsed. In either case the angle sign will be obvious from the altered presentation of display 22. That is, if the artificial delay is continuous, the signal at mixer 14 from one antenna will always be delayed relative to the signal at the mixer from the other antenna, and the delay will be presented as a single peak on a scale of −90° to +90° or zero to 2L/C. And, if the artificial delay is pulsed, sidelobes of the presentation will be shifted toward zero if the source is nearest the antenna having the artificial delay and outward if the source is farthest from the antenna having the artificial delay.

What is claimed is:

1. A direction finder for measuring the arrival direction of detected radiation, and, thereby, the direction to the radiation source, comprising:
   a plurality of radiation receiving means, each of which is for receiving said radiation and converting said radiation into an electrical signal;
   means coupled to said plurality of receiving means for summing said electrical signals and providing an output of the sum;
   signal processing means coupled to said output of said summing and providing means for correlating said electrical signals; and
   display means coupled to said processing means for indicating the arrival direction of said detected radiation.

2. The direction finder of claim 1 wherein said signal processing means includes;
   means for obtaining the spectrum of said summed signals,
   means for obtaining the power spectrum of said summed signals from said spectrum, and
   means for obtaining the correlation function of said summed signals from said power spectrum.

3. The direction finder of claim 2 wherein said spectrum obtaining means includes;
   an ultrasonic light modulator coupled to said summed electrical signals,
   an illumination source providing a substantially coherent, monochromatic light beam impinging on said ultrasonic light modulator at the Bragg angle, and
   a lens positioned in the path of the light beam exiting said ultrasonic light modulator for focusing said exiting light beam,
   such that ultrasonic waves are established in said light modulator in response to said summed electrical signals and said exiting light beam is said impinging light beam modulated by said ultrasonic waves.

4. The direction finder of claim 3 wherein said power spectrum obtaining means includes a vidicon positioned in the focal plane of said lens such that said focused beam is detected by said vidicon.

5. The direction finder of claim 4 wherein said correlation function obtaining means includes a digital computer.

6. A method of measuring the arrival direction of detected radiation, comprising the steps of;
   receiving said radiation at a plurality of locations,
   converting said received radiation of each said location into electrical signals,
   combining said electrical signals,
   acousto-optically processing said combined signals to obtain the spectrum of said combined signals,
   optically processing said spectrum to obtain the power spectrum of said combined signals,
   electronically processing said power spectrum to obtain the correlation function of said combined signals, and
   displaying said correlation function,
   wherein said display indicates the arrival direction of said detected radiation.

* * * * *